Patented May 1, 1928.

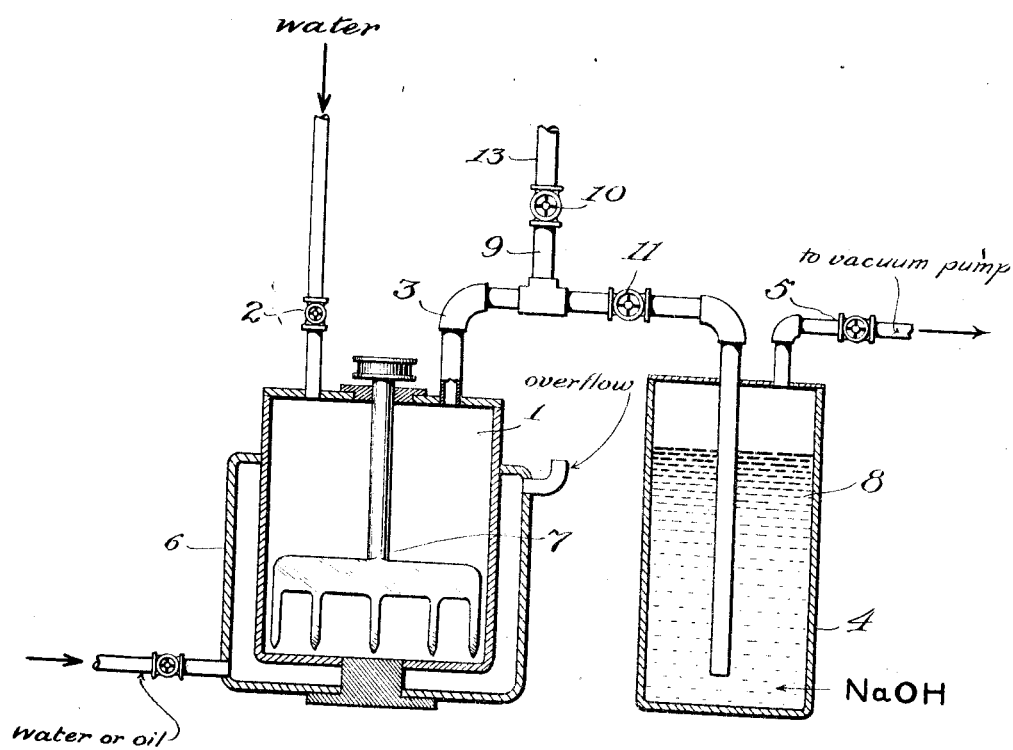

1,667,838

UNITED STATES PATENT OFFICE.

GUY H. BUCHANAN, OF WESTFIELD, NEW JERSEY, ASSIGNOR TO AMERICAN CYANAMID COMPANY, OF NEW YORK, N. Y., A CORPORATION OF MAINE.

PROCESS OF MAKING HYDROCYANIC ACID FROM CRUDE CYANIDES.

Application filed March 25, 1924. Serial No. 701,742.

This invention relates to a process of making hydrocyanic acid from crude cyanides derived from lime nitrogen and has for its object to improve the procedures heretofore proposed.

With these and other objects in view, the invention consists in the novel steps and combinations of steps constituting the process, all as will be more fully hereinafter disclosed and particularly pointed out in the claims.

Referring to the accompanying drawing forming a part of this specification in which the figure is a diagrammatic sectional view of one form of apparatus suitable for carrying out this invention, 1 indicates a generating vessel, 2 a pipe joined to said vessel, 4 an absorbing unit containing an absorbing solution 8, 3 a pipe joined to vessel 1 and to unit 4 and dipping below the surface of absorbing solution 8, 5 a pipe joined to unit 4, 6 a water jacket for vessel 1, 7 an agitator in said vessel 1, 11 a valve in pipe 3, 13 a pipe joined to pipe 3 and containing valve 10.

In order that the invention may be more clearly understood it is said:—In the processes heretofore proposed for the production of hydrocyanic acid from the well known cyanides of commerce, it has been customary to treat said cyanides with an acid and thereby form a solution of hydrocyanic acid from which the desired hydrocyanic acid is recovered by distillation. In a co-pending application entitled "Process of recovering hydrocyanic acid" filed by Guy H. Buchanan and G. B. Winner, on the 25th day of March, 1924, Serial No. 701,741, there is also disclosed a method whereby hydrocyanic acid may be produced by treating an alkaline earth metal cyanide with water vapor.

In this invention, on the other hand, there is disclosed a process whereby a crude cyanide compound such as is derived from lime nitrogen may be treated with water in the liquid state and hydrocyanic acid recovered.

This said impure cyanide may be made, for example, by fusing lime nitrogen, common salt, and calcium carbide together in an electric furnace to produce a mixture of sodium and calcium cyanides. The proportions in the charge may vary depending on the desired concentration of the cyanogen in the resulting product. For example, a standard grade of this said impure cyanide contains 25—26 per cent cyanogen probably largely in the form of calcium cyanide. Also, it contains free lime, calcium carbide, calcium chloride, sodium chloride, carbon and other impurities in quantities depending upon the materials from which it is produced and on the particular process used.

It is well known in the art that solutions of alkaline earth metal cyanides are unstable and decompose to form hydrocyanic acid and the so-called well known azulmic acid compounds, the azulmic compounds being produced by decomposition of a portion of the hydrocyanic acid. But the hydrocyanic acid thus formed usually escapes and there is left behind only the azulmic acid bodies and a precipitate composed of an alkaline earth metal hydroxide.

The relative amounts of hydrocyanic acid and of the azulmic bodies produced has formerly been considered to depend solely upon the concentration of the alkaline earth metal cyanide solution, and the statement is frequently made that solutions of calcium cyanide, for example, will decompose almost completely with the production of azulmic bodies if such solutions are of a concentration greater than 15%.

I have discovered, however, that azulmic bodies are not formed in appreciable quantities provided the hydrocyanic acid is removed from the mixtures or solutions as rapidly as it is formed. An explanation of the formation of the azulmic bodies is believed to be as follows: The alkali earth metal cyanides are rapidly hydrolyzed in concentrated solutions with formation of hydrocyanic acid, and an alkali earth metal hydroxide. Owing to the fact that the base so liberated is relatively insoluble it is precipitated out and free hydrocyanic acid is left in the solution. I have found that hydrocyanic acid is unstable under such conditions, being rapidly polymerized to form the brown azulmic products above mentioned. Thus an alkaline solution of hydrocyanic acid rapidly turns brown and deposits large flocks of azulmic acid.

I have further discovered, however, if the hydrocyanic acid be removed from the solution as rapidly as it is formed, azulmic bodies are not produced in substantial amounts and recoveries of hydrocyanic acid may be obtained in excess of 90% of the theoretical. These recoveries may be secured from the most highly concentrated solutions of alkaline earth metal cyanides, and may even be obtained when an alkaline earth metal cyanide such as a crude calcium cyanide, derived from lime nitrogen is merely moistened with water. To produce hydrocyanic acid from such a crude alkaline earth metal cyanide according to my process, it is only necessary to add to the crude cyanide compound an amount of water in slight excess of that theoretically required to complete the following reaction:

and then to remove the liberated hydrocyanic acid by reducing the pressure over the mixture, either with or without the application of external heat, or such hydrocyanic acid may be removed by sweeping it out with a current of some inert gas such as nitrogen or even air.

In carrying out my process, I introduce into the generating vessel 1 a predetermined quantity of the crude calcium cyanide, for example an amount sufficient to fill the generator say one-quarter full. I then close the generator, start the agitator 7 and apply a vacuum to pipe 13, valve 11 being closed, and valve 10 being open. When the system has been evacuated until a vacuum of 25 inches of mercury has been produced, I admit water through pipe 2. The quantity of water admitted will vary with the size of the charge of crude cyanide. It is preferred to use an amount equal in weight to substantially 60% the weight of the crude cyanide used. I may, however, use as little water as 40% or as much as 200% of the weight of the cyanide charge. In practice it is preferred to add the water slowly governing the rate of addition by the rate of evolution of gases from the generator. I may, also add the water intermittently in portions equal to approximately one-tenth of the entire amount used. During the addition I prefer to maintain the water in jacket 6 at a temperature which does not exceed 60° C. When all the water has been added, I raise the temperature of the water in jacket 6 to the boiling point, and maintain a vacuum of say 25 inches of mercury within the system until all evolution of gas has ceased, in order to recover all of the hydrocyanic acid present. The hydrocyanic acid gas thus produced in the vessel 1 passes out of vessel 1 as fast as it is formed through the pipe 3, and the valve 11 being closed and the valve 10 being open, it will pass through pipe 13 into and through a vacuum pump not shown and into a condensing chamber, not shown, where it may be liquefied by any suitable means, such as a refrigerating apparatus.

Should it be desired to make sodium cyanide by this process, said hydrocyanic acid gas may be passed into the sodium hydroxide solution 8 by closing valve 10 and opening valve 11, whereupon the pipe 5 may be connected to a vacuum pump not shown.

When I use say 200% excess of water, I prefer to add it all at one time, and to maintain the temperature of the mixture at the boiling point.

By operating in this manner I have repeatedly obtained a 90% recovery of hydrocyanic acid in a comparatively pure form, or an equivalent recovery, in a solution of sodium cyanide in the absorber 4.

It will now be clear that I have produced a process whereby a crude alkaline earth metal cyanide compound made from lime nitrogen may be treated with water in such a way that hydrocyanic acid is formed, said process being adapted to remove the hydrocyanic acid from the reaction zone before said hydrocyanic acid has been decomposed, and to recover said hydrocyanic acid in a suitable manner.

What I claim is:—

1. The process of producing hydrocyanic acid from a crude cyanide containing an alkali earth metal compound which comprises treating the said cyanide with water; and removing hydrocyanic acid from the zone of reaction, before any objectionable quantities of azulmic compounds are formed.

2. The process of producing hydrocyanic acid from a crude cyanide containing an alkali earth metal compound which consists in treating the said cyanide with water, and removing the hydrocyanic acid from the zone of reaction under a pressure less than that of the atmosphere and before any objectionable quantities of azulmic compounds are formed.

3. The process of producing hydrocyanic acid from a crude cyanide containing an alkali earth metal compound which consists in treating the said cyanide with water; removing the hydrocyanic acid thus produced from the zone of reaction, substantially as fast as it is formed; and recovering the same.

4. The process of producing hydrocyanic acid from a crude cyanide containing an alkali earth metal compound which consists in treating the said cyanide with water while under a pressure less than that of the atmosphere; maintaining the temperature of the mixture below 60° C.; recovering a portion of the produced hydrocyanic acid; raising the temperature of the mixture to a point above 60° C.; and recovering the remainder of the hydrocyanic acid.

5. The process of producing hydrocyanic acid from a crude cyanide containing an alkali earth metal compound which comprises gradually supplying water to said crude cyanide; and removing hydrocyanic acid from the zone of the reaction, substantially as fast as it is formed.

6. The process of producing hydrocyanic acid from a crude cyanide containing an alkali earth metal compound which consists in gradually supplying water to said crude cyanide; heating the mixture under a pressure less than that of the atmosphere; and recovering the hydrocyanic acid formed substantially as fast as it is evolved.

7. The process of producing hydrocyanic acid from a crude cyanide containing an alkali earth metal compound which consists in supplying water to said crude cyanide; heating the mixture under a reduced pressure and recovering the hydrocyanic acid formed substantially as fast as it is evolved.

8. The process of producing hydrocyanic acid from a crude cyanide containing an alkali earth metal compound which consists in supplying water to said crude cyanide in an amount greater than 40% of the weight of said cyanide and less than 200% of the weight of the said cyanide; heating the mixture under a reduced pressure; and recovering the hydrocyanic acid thus formed.

In testimony whereof I affix my signature.

GUY H. BUCHANAN.